(12) United States Patent
Yuasa

(10) Patent No.: US 12,179,497 B2
(45) Date of Patent: Dec. 31, 2024

(54) IMAGE FORMING APPARATUS

(71) Applicant: KYOCERA Document Solutions Inc., Osaka (JP)

(72) Inventor: Yuzuru Yuasa, Osaka (JP)

(73) Assignee: Kyocera Document Solutions, Inc. (JP)

( * ) Notice: Subject to any disclaimer, the term of this patent is extended or adjusted under 35 U.S.C. 154(b) by 175 days.

(21) Appl. No.: 17/969,367

(22) Filed: Oct. 19, 2022

(65) Prior Publication Data

US 2023/0129713 A1    Apr. 27, 2023

(30) Foreign Application Priority Data

Oct. 26, 2021 (JP) .................................. 2021-174360

(51) Int. Cl.
*B41J 2/21* (2006.01)
*G06K 15/02* (2006.01)

(52) U.S. Cl.
CPC ........... *B41J 2/2142* (2013.01); *B41J 2/2146* (2013.01); *G06K 15/02* (2013.01)

(58) Field of Classification Search
CPC .... B41J 2/2114; B41J 2/04505; B41J 25/001; B41J 3/543; B41J 29/393; B41J 2/12; B41J 2/125; G06K 15/02
See application file for complete search history.

(56) References Cited

U.S. PATENT DOCUMENTS

| | | | |
|---|---|---|---|
| 7,309,118 B2 * | 12/2007 | Mizes | B41J 2/2135 347/19 |
| 8,662,625 B2 * | 3/2014 | Donaldson | H04N 1/506 347/19 |
| 8,985,725 B2 * | 3/2015 | Mizes | B41J 2/2146 347/14 |
| 2005/0057598 A1 * | 3/2005 | Endo | B41J 29/393 347/19 |
| 2006/0092211 A1 | 5/2006 | Arakawa et al. | |
| 2006/0158472 A1 * | 7/2006 | Endo | B41J 11/0095 347/14 |
| 2010/0013882 A1 * | 1/2010 | Mizes | B41J 29/393 347/14 |

(Continued)

FOREIGN PATENT DOCUMENTS

JP    2006-142807    6/2006

*Primary Examiner* — John Zimmermann

(57) ABSTRACT

A control unit determines nozzles corresponding to the image to be printed and causes a recording head to eject ink from the nozzles. A correction processing unit performs a correction process corresponding to each of ink ejection malfunction positions in the image. The correction processing unit (a) prints a test pattern using the recording head, (b) determines the ink ejection malfunction positions on the basis of a scanned image of the test pattern, (c) determines a droplet hit position deviation amount of the ink at each of the ink ejection malfunction positions, and (d) determines a print sheet type of the print sheet, performs comparison between the droplet hit position deviation amount and a threshold value set for the print sheet type, and determines whether the correction process should be performed to the ink ejection malfunction position or not on the basis of a result of the comparison.

5 Claims, 7 Drawing Sheets

(56) References Cited

U.S. PATENT DOCUMENTS

| | | | |
|---|---|---|---|
| 2011/0279513 A1* | 11/2011 | Mizes | B41J 29/393 |
| | | | 347/19 |
| 2012/0050376 A1* | 3/2012 | Nagoshi | B41J 29/393 |
| | | | 347/19 |
| 2018/0215143 A1* | 8/2018 | Hoover | B41J 25/001 |
| 2019/0299680 A1* | 10/2019 | Kurihara | B41J 2/2142 |
| 2023/0126430 A1* | 4/2023 | Kawashima | G06K 15/102 |
| | | | 347/1 |

\* cited by examiner

FIG. 4

| NOZZLE NUMBER OF NOZZLE OF DROPLET HIT POSITION DEVIATION | DROPLET HIT POSITION DEVIATION AMOUNT [μm] | PRINT SHEET TYPE | |
|---|---|---|---|
| | | OFFSET COATED PAPER (IMPERMEABLE TYPE) THRESHOLD VALUE = 21 μm | PLAIN PAPER (PERMEABLE TYPE) THRESHOLD VALUE = 25 μm |
| AAAAAA | +30 | WITH CORRECTION PROCESS | WITH CORRECTION PROCESS |
| BBBBBB | −27 | WITH CORRECTION PROCESS | WITH CORRECTION PROCESS |
| CCCCCC | +25 | WITH CORRECTION PROCESS | WITH CORRECTION PROCESS |
| XXXXXX | +22 | WITH CORRECTION PROCESS | WITHOUT CORRECTION PROCESS |
| YYYYYY | −21 | WITH CORRECTION PROCESS | WITHOUT CORRECTION PROCESS |

IMAGE FORMING APPARATUS

CROSS-REFERENCE TO RELATED APPLICATIONS

This application relates to and claims priority rights from Japanese Patent Application No. 2021-174360, filed on Oct. 26, 2021, the entire disclosures of which are hereby incorporated by reference herein.

BACKGROUND

1. Field of the Present Disclosure

The present disclosure relates to an image forming apparatus.

2. Description of the Related Art

An inkjet-type image forming apparatus detects a malfunction nozzle that becomes unable to properly eject ink, among nozzles that eject ink in a recording head, and changes an ink ejection amount for an adjacent dot on the basis of an occurrence status of the malfunction nozzle.

When printing on a cut sheet, a nozzle used to depict each pixel in an image to be printed is differently determined sheet by sheet on the basis of a sheet transportation condition and correspondingly to a position (i.e. a position in a direction perpendicular to a transportation direction) of an incoming sheet in transportation. As mentioned, if the ink ejection amount is corrected due to the malfunction nozzle, then in a short time from determination of the sheet position to ink ejection, it is required to determine a pixel corresponding to the malfunction nozzle in the image to be printed and to perform a correction process for a periphery of the determined pixel.

Therefore, if many ink ejection malfunction positions appear to be corrected, the aforementioned correction process can not be completed in the short time. Although such many ink ejection malfunction positions can be corrected by performing the correction process using high-speed hardware, such high-speed hardware results in a high cost of the apparatus.

SUMMARY

An image forming apparatus according to an aspect of the present disclosure includes a recording head, a control unit, and a correction processing unit. The recording head is configured to eject ink corresponding to an image to be printed, using arranged nozzles. The control unit is configured to determine nozzles corresponding to the image to be printed, correspondingly to a position of a print sheet, and cause the recording head to eject ink from the nozzles. The correction processing unit is configured to perform a correction process corresponding to each of plural ink ejection malfunction positions in the image. Further, the correction processing unit (a) prints a test pattern using the recording head, (b) determines the ink ejection malfunction positions on the basis of a scanned image of the test pattern, (c) determines a droplet hit position deviation amount of the ink at each of the ink ejection malfunction positions, and (d) determines a print sheet type of the print sheet, performs comparison between the droplet hit position deviation amount and a threshold value set for the print sheet type, and determines whether the correction process should be performed to the ink ejection malfunction position or not on the basis of a result of the comparison.

These and other objects, features and advantages of the present disclosure will become more apparent upon reading of the following detailed description along with the accompanied drawings.

BRIEF DESCRIPTION OF THE DRAWINGS

FIG. 4 shows a diagram that indicates an example of print sheet type data 73a;

DETAILED DESCRIPTION

Hereinafter, embodiments according to an aspect of the present disclosure will be explained with reference to drawings.

Embodiment 1

Figure 1:
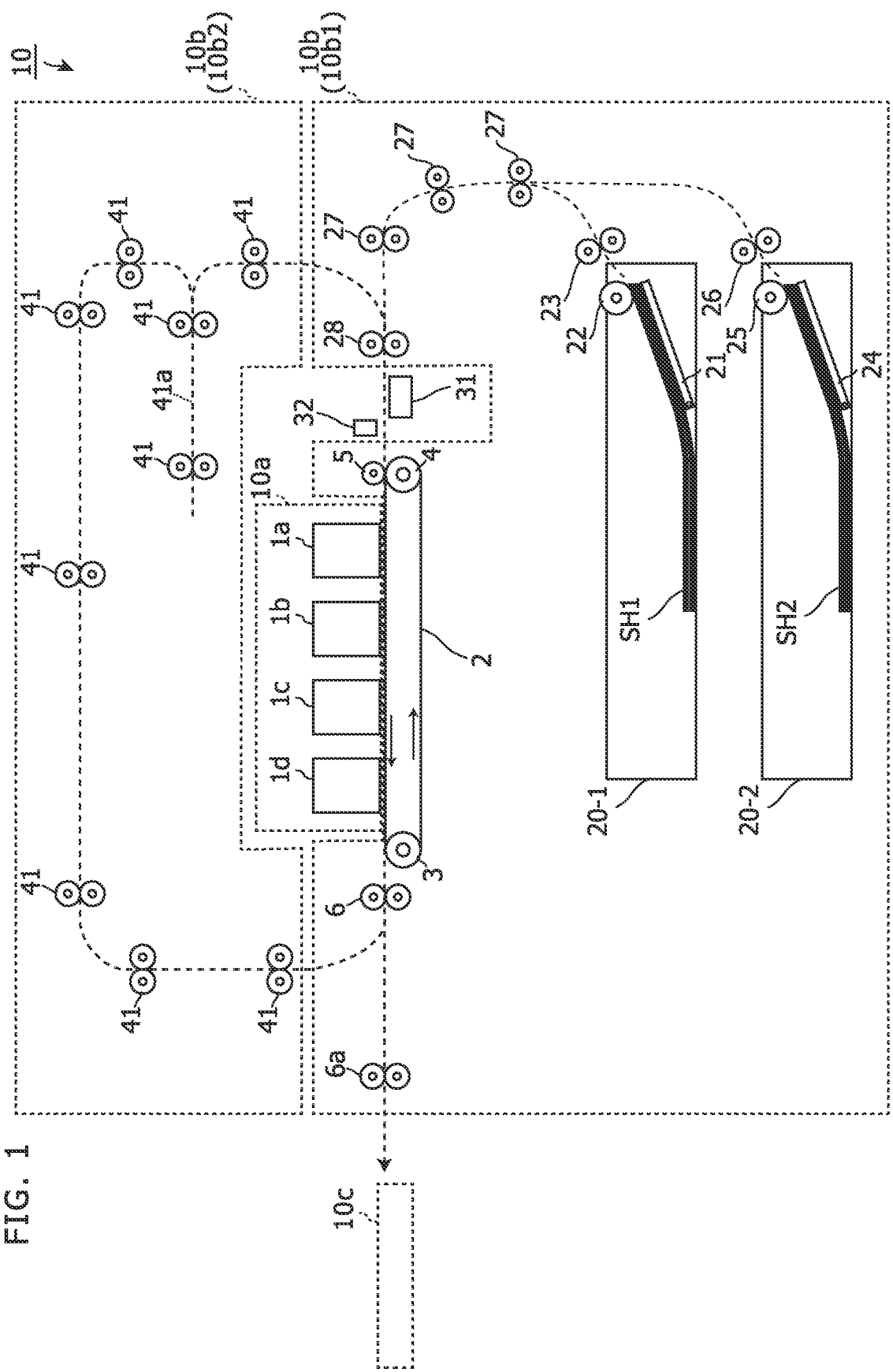
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus 10 in this embodiment is an apparatus such as printer, copier, facsimile machine or multi function peripheral.

The image forming apparatus 10 shown in FIG. 1 includes a print engine 10a and a sheet transportation unit 10b. The print engine 10a physically forms an image to be printed on a print sheet (print paper sheet or the like). In this embodiment, the print engine 10a is a line-type inkjet print engine.

In this embodiment, the print engine 10a includes linetype head units 1a to 1d corresponding to four ink colors: Cyan, Magenta, Yellow, and Black.

Figure 2:
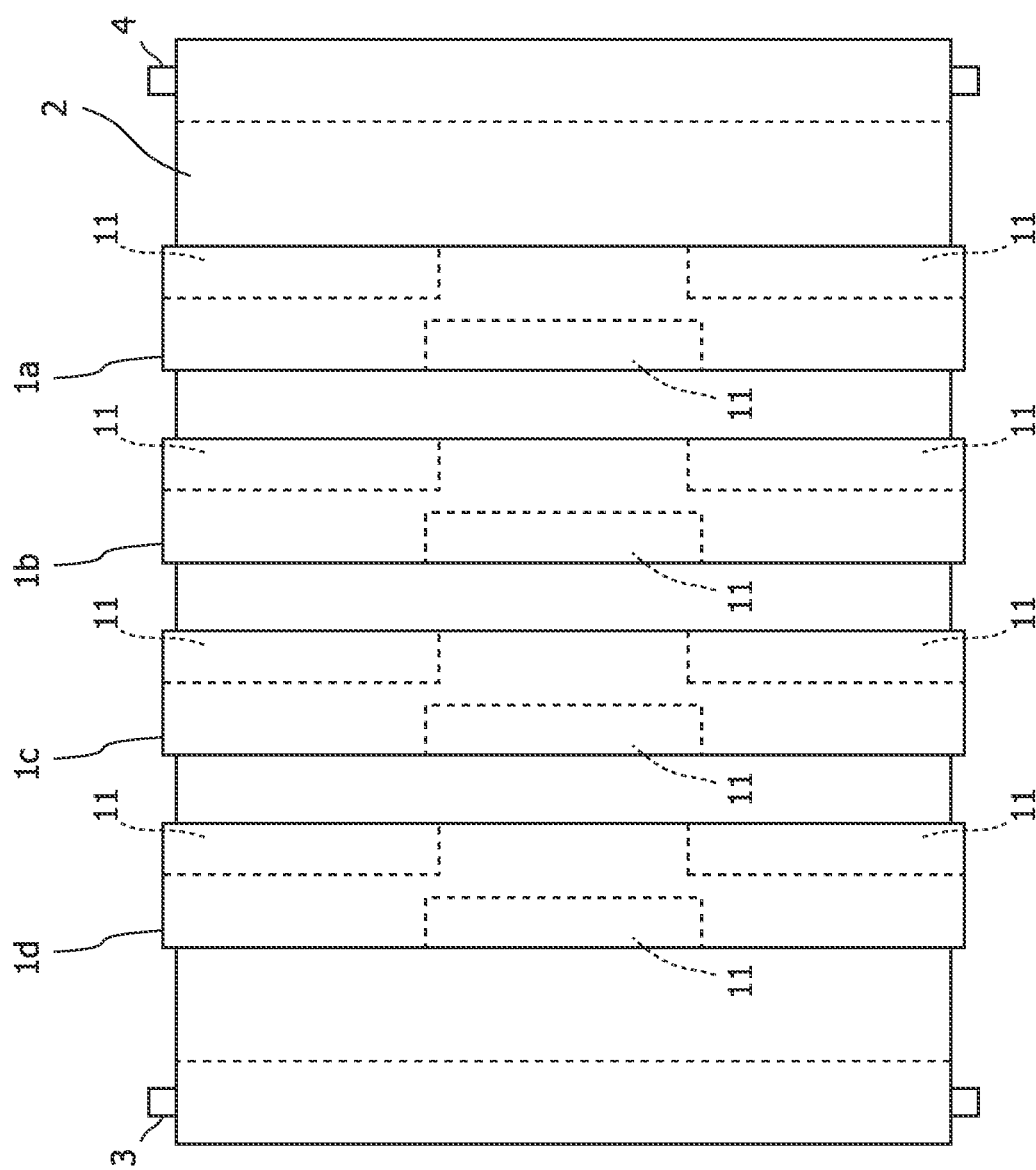
FIG. 2 shows a plane view of an example of recording heads 1a to 1d in the image forming apparatus 10 shown in FIG. 1.

FIG. 2 shows a plane view of an example of recording heads 1a to 1d in the image forming apparatus 10 shown in FIG. 1. As shown in FIG. 2, for example, in this embodiment, each of the inkjet recording units 1a, 1b, 1c and 1d includes plural (here, three) head units 11. The head units 11 are arranged along a primary scanning direction, and are capable of being mounted to and demounted from a main body of the image forming apparatus. Each of the inkjet recording units 1a, 1b, 1c and 1d may include only one head unit 11. The head unit 11 of the inkjet recording unit 1a, 1b, 1c or 1d includes 2-dimensionally arranged nozzles, and ejects ink corresponding to the image to be printed using the nozzles.

The sheet transportation unit 10b transports the print sheet to the print engine 10a along a predetermined transportation path, and transports the print sheet after printing from the print engine 10a to a predetermined output destination (here, an output tray 10c or the like).

The sheet transportation unit 10b includes a main sheet transportation unit 10b1 and a circulation sheet transportation unit 10b2. In duplex printing, the main sheet transportation unit 10b1 transports to the print engine 10a a print sheet to be used for printing of a first-surface page image, and the circulation sheet transportation unit 10b2 transports the print sheet from a posterior stage of the print engine 10a to a prior stage of the print engine 10a with detaining a predetermined number of print sheets.

In this embodiment, the main sheet transportation unit 10b1 includes (a) a circular-type transportation belt 2 that is arranged so as to be opposite to the print engine 10a and transports a print sheet, (b) a driving roller 3 and a driven roller 4 around which the transportation belt 2 is hitched, (c) a nipping roller 5 that nips the print sheet with the transportation belt 2, and (d) output roller pairs 6 and 6a.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units 1a to 1d in turn, and on the print sheet, images of respective colors are printed by the inkjet recording units 1a to 1d. Subsequently, after the color printing, the print sheet is outputted by the output roller pairs 6 and 6a to an output tray 10c or the like.

Further, the main sheet transportation unit 10b1 includes plural sheet feeding cassettes 20-1 and 20-2. The sheet feeding cassettes 20-1 and 20-2 store print sheets SH1 and SH2 of which print sheet types are different from each other, for example, and push up the print sheets SH1 and SH2 using lift plates 21 and 24 so as to cause the print sheets SH1 and SH2 to contact with pickup rollers 22 and 25, respectively. The print sheets SH1 and SH2 put on the sheet feeding cassettes 20-1 and 20-2 are picked up to sheet feeding rollers 23 and 26 by the pickup rollers 22 and 25 sheet by sheet from the upper sides, respectively. The sheet feeding rollers 23 and 26 are rollers that transport the print sheets SH1 and SH2 sheet by sheet fed by the pickup rollers 22 and 25 from the sheet feeding cassettes 20-1 and 20-2 onto a transportation path. A transportation roller 27 is a transportation roller on the transportation path common to the print sheets SH1 and SH2 transported from the sheet feeding cassettes 20-1 and 20-2.

When performing duplex printing, the circulation sheet transportation unit 10b2 returns the print sheet from a predetermined position in a downstream side of the print engine 10a to a predetermined position in an upstream side of the print engine 10a (here, to a predetermined position in an upstream side of a line sensor 31 mentioned below). The circulation sheet transportation unit 10b2 includes a transportation roller 41, and a switch back transportation path 41a that reverses a movement direction of the print sheet in order to change a surface that should face the print engine 10a among surfaces of the print sheet from the first surface to the second surface of the print sheet.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges (both side end edges) of the print sheet. For example, the line sensor 31 is a CIS (Contact Image Sensor). In this embodiment, the line sensor 31 is arranged at a position between the registration roller 28 and the print engine 10a.

The sheet detecting sensor 32 is an optical sensor that detects that a top end of the print sheet SH1 or SH2 passes through a predetermined position on the transportation path. The line sensor 31 detects the positions of the both side end edges at a time point that the top end of the print sheet SH1 or SH2 is detected by the sheet detecting sensor 32.

For example, as shown in FIG. 1, the print engine 10a is arranged in one of an upward part of the transportation path and a downward part of the transportation path (here, in the upward part); the line sensor 31 is arranged in the other of the upward part of the transportation path and the downward part of the transportation path (here, in the downward part); and the circulation transportation unit 10b2 transports the print sheet from the downstream side of the print engine 10a to the upstream side of the line sensor 31 with changing an orientation of the print sheet in a switch back manner.

Figure 3:
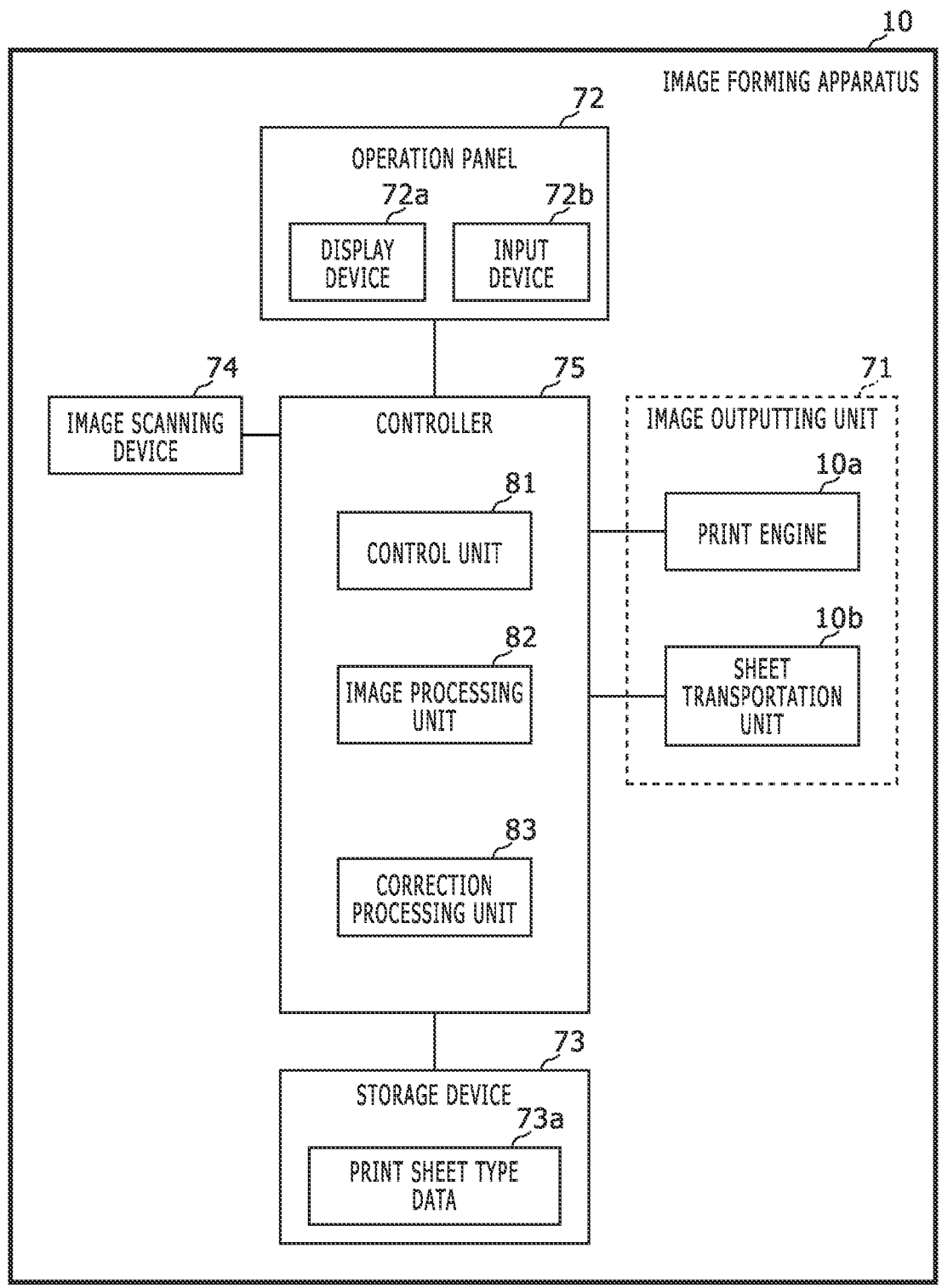
FIG. 3 shows a block diagram that indicates an electronic configuration of the image forming apparatus 10 in the embodiment according to the present disclosure.

FIG. 3 shows a block diagram that indicates an electronic configuration of the image forming apparatus 10 in the embodiment according to the present disclosure. As shown in FIG. 3, the image forming apparatus 10 includes not only an image outputting unit 71 that includes the mechanical configuration shown in FIGS. 1 and 2 but an operation panel 72, a storage device 73, an image scanning device 74, and a controller 75.

The operation panel 72 is arranged on a housing surface of the image forming apparatus 10, and includes a display device 72a such as a liquid crystal display and an input device 72b such as a hard key and/or touch panel, and displays sorts of messages for a user using the display device 72a and receives a user operation using the input device 72b.

The storage device 73 is a non-volatile storage device (flash memory, hard disk drive or the like) in which data, a program and the like have been stored that are required for control of the image forming apparatus 10.

The storage device 73 stores print sheet type data 73a. Regarding one or plural print sheet types, the print sheet type data 73a indicates which of an impermeable sheet type and a permeable sheet type the print sheet type is, and further indicates a threshold value mentioned below for each print sheet type (this threshold value is for selecting whether a correction process is to be performed or not for a nozzle raising ink droplet hit position deviation).

Regarding this threshold value, a single value may be set for all of the impermeable sheet types and a single value may be set for all of the permeable sheet types.

Further, regarding this threshold value, the threshold value of the impermeable sheet type is set to be lower than the threshold value of the permeable sheet type. In a print sheet of the permeable sheet type, ink permeates in a primary scanning direction and therefore density lack (blank line or the like) is not visually perceived easily compared to the impermeable sheet type. Therefore, the threshold value is set as mentioned.

The image scanning device 74 includes a platen glass and an auto document feeder, and optically scans a document image from a document put on the platen glass or a document fed by the auto document feeder, and generates image data of the document image.

The controller 75 includes a computer that performs a software process in accordance with a program, an ASIC (Application Specific Integrated Circuit) that performs a predetermined hardware process, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required). Here, the controller 75 acts as a control unit 81, an image processing unit 82, and a correction processing unit 83.

The control unit 81 controls the image outputting unit 71 (the print engine 10a, the sheet transportation unit 10b and the like), and thereby performs a print job requested by a user. In this embodiment, the control unit 81 causes the image processing unit 82 to perform a predetermined image process, and controls the print engine 10a (the head units 11) and causes the head units 11 to eject ink and thereby forms a print image on a print sheet. The image processing unit 82 performs a predetermined image process such as RIP (Raster Image Processing), color conversion, halftoning and/or the like for image data of a printing image.

Specifically, the control unit 81 causes the print engine 10a to print a user document image based on printing image data specified by a user.

Further, in this embodiment, the control unit 81 has an automatic centering function that (a) determines as an actual sheet center position a center position of a print sheet on the basis of the positions of both side end edges of the print sheet detected by the line sensor 31, and (b) adjusts a center position of an image to be printed, on the basis of a difference from the actual sheet center position, and performs the automatic centering function as a hardware process.

Specifically, in the automatic centering function, the control unit 81 changes a depicting position of the image to be printed, in a primary scanning direction by a difference between a reference center position of the print engine 10a and the actual sheet center position. In this embodiment, because the nozzles of the recording heads 1a to 1d do not move, a nozzle corresponding to each pixel in the image to be printed is changed correspondingly to the depicting position of the image to be printed.

As mentioned, the control unit 81 determines nozzles corresponding to the image to be printed (a nozzle corresponding to each pixel), correspondingly to a position of a print sheet, and causes the recording heads 1a to 1d to eject ink from the determined nozzles.

The correction processing unit 83 performs as a hardware process the correction process corresponding to each of the plural ink ejection malfunction positions in the image to be printed. In this correction process, for example, image data (a pixel value) of a pixel adjacent to the ink ejection malfunction position is corrected such that a density of this adjacent pixel gets higher.

Further, the correction processing unit 83 performs a correction setting process. In the correction setting process, the correction processing unit 83 determines ink ejection malfunction positions (i.e. ink ejection malfunction nozzles of the recording heads 1a to 1d), selects ink ejection malfunction positions as targets of the correction process among the determined ink ejection malfunction positions, and stores the selected ink ejection malfunction positions (i.e. targets of the correction process) as correction setting data into the storage device 73.

Specifically, for the correction setting process, the correction processing unit 83 (a) prints a test pattern using the recording heads 1a to 1d, (b) determines the ink ejection malfunction positions on the basis of a scanned image of the test pattern, and (c) determines a droplet hit position deviation amount (primary-scanning-directional deviation amount of a hit position of an ink droplet) of the ink at each of the ink ejection malfunction positions; and for the correction process, the correction processing unit 83 (d) determines a print sheet type of the print sheet, performs comparison between the droplet hit position deviation amount and a threshold value set for the print sheet type, and determines whether the correction process should be performed to the ink ejection malfunction position or not on the basis of a result of the comparison.

In this embodiment, as mentioned, the threshold value of an impermeable sheet type as the print sheet type is set to be lower than the threshold value of a permeable sheet type as the print sheet type.

FIG. 4 shows a diagram that indicates an example of the print sheet type data 73a. For example, as shown in FIG. 4, a droplet hit position deviation amount is determined of each nozzle raising droplet hit position deviation, and the droplet hit position deviation amount (absolute value) and a threshold value set for the print sheet type are compared with each other; and the correction process is performed for a nozzle raising a droplet hit position deviation amount larger than the threshold value, and the correction process is not performed for a nozzle of which a droplet hit position deviation amount is not larger than the threshold value. It should be noted that in FIG. 4 the droplet hit position deviation amounts are expressed as absolute values, and a positive quantity and a negative quantity of them mean directions of the deviation. For example, in FIG. 4, the threshold values (21 micro meters and 25 micro meters) are set differently from each other for offset coated paper of the impermeable sheet type and plain paper of the permeable sheet type, respectively.

Further, in this embodiment, the correction processing unit 83 prints the test pattern using the recording heads 1a to 1d on a print sheet of the impermeable sheet type. Regarding a print sheet of the impermeable sheet type, density lack is easily detected in the scanned image because ink permeation in the primary scanning direction is small, and consequently, the droplet hit position deviation amounts are correctly measured.

Figure 5:
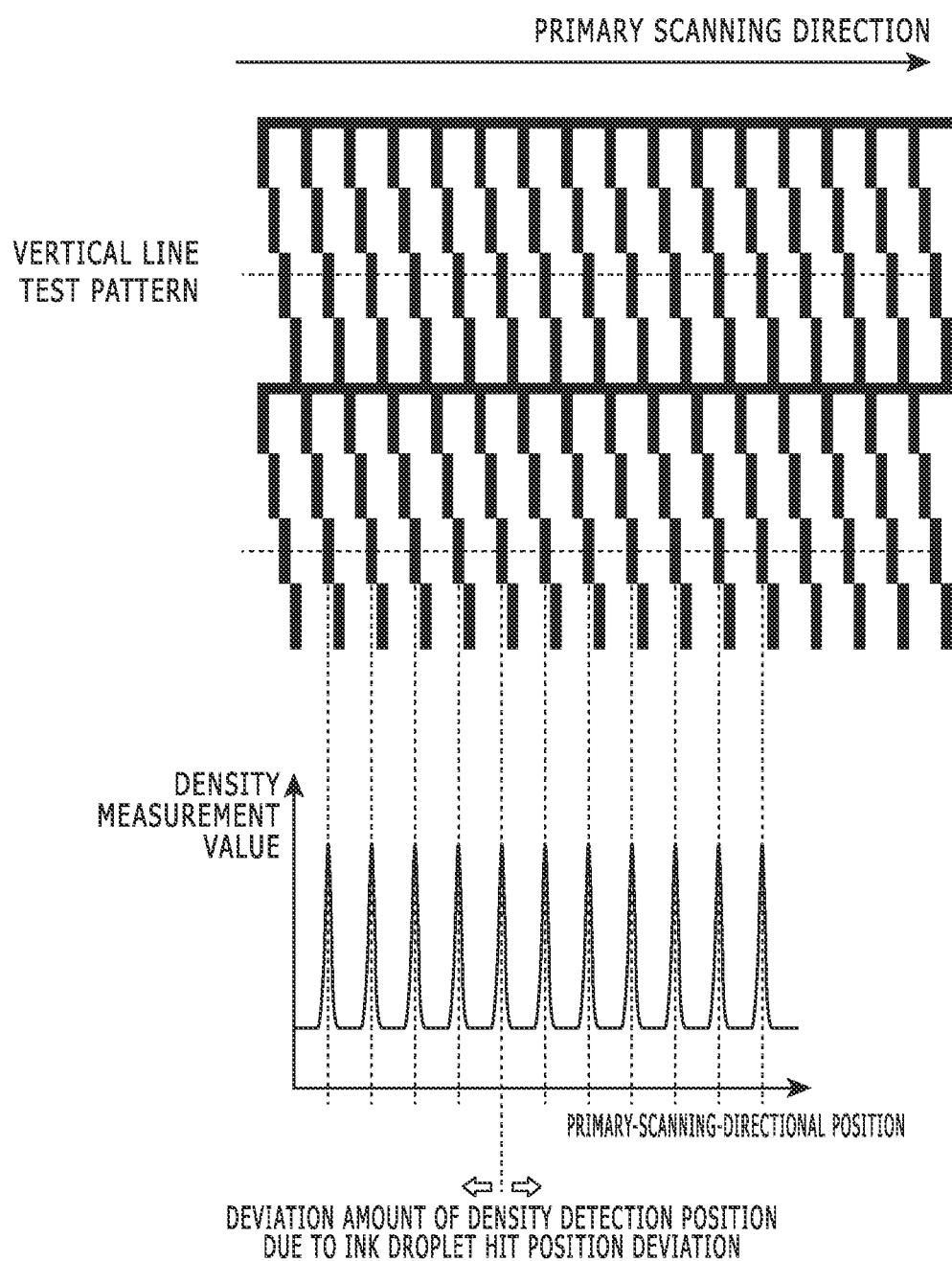
FIG. 5 shows a diagram that explains detection of a droplet hit position deviation amount based on a density distribution of a scanned image of a vertical line test pattern.

FIG. 5 shows a diagram that explains detection of a droplet hit position deviation amount based on a density distribution of a scanned image of a vertical line test pattern. It should be noted that an arrangement order of vertical lines in the vertical line test pattern is not limited to that shown in FIG. 5.

In Embodiment 1, the correction processing unit 83 prints a vertical line test pattern that includes thin lines (straight thin lines along a secondary scanning direction) individually corresponding to nozzles of the recording heads 1a to 1d; and as shown in FIG. 5, for example, determines a deviation amount of a density detection position in the scanned image of the vertical line test pattern on the basis of density detection positions (a period of the density detection positions) in the scanned image of the vertical line test pattern, and multiplies the determined deviation amount by a predetermined coefficient and thereby converts the determined deviation amount in the image to a droplet hit position deviation amount.

The aforementioned scanned image of the test pattern is obtained using the line sensor 31 or the image scanning device 74. If the line sensor 31 is used for the aforementioned detection of the ink ejection malfunction position and the droplet hit position deviation amount, the circulation transportation unit 10b2 transports the print sheet on which the test pattern has been printed, the line sensor 31 scans an image of the printed test pattern. Subsequently, the ink ejection malfunction position and the droplet hit position deviation amount are automatically detected, and thereafter the print sheet on which the test pattern has been printed is outputted. Further, instead of the line sensor 31, the print sheet on which the test pattern has been printed may be immediately outputted and set on the image scanning device 74 by a user, and the image on the print sheet (i.e. an image of the test pattern) may be scanned by the image scanning device 74 and the ink ejection malfunction position and the droplet hit position deviation amount may be detected.

Figure 6:
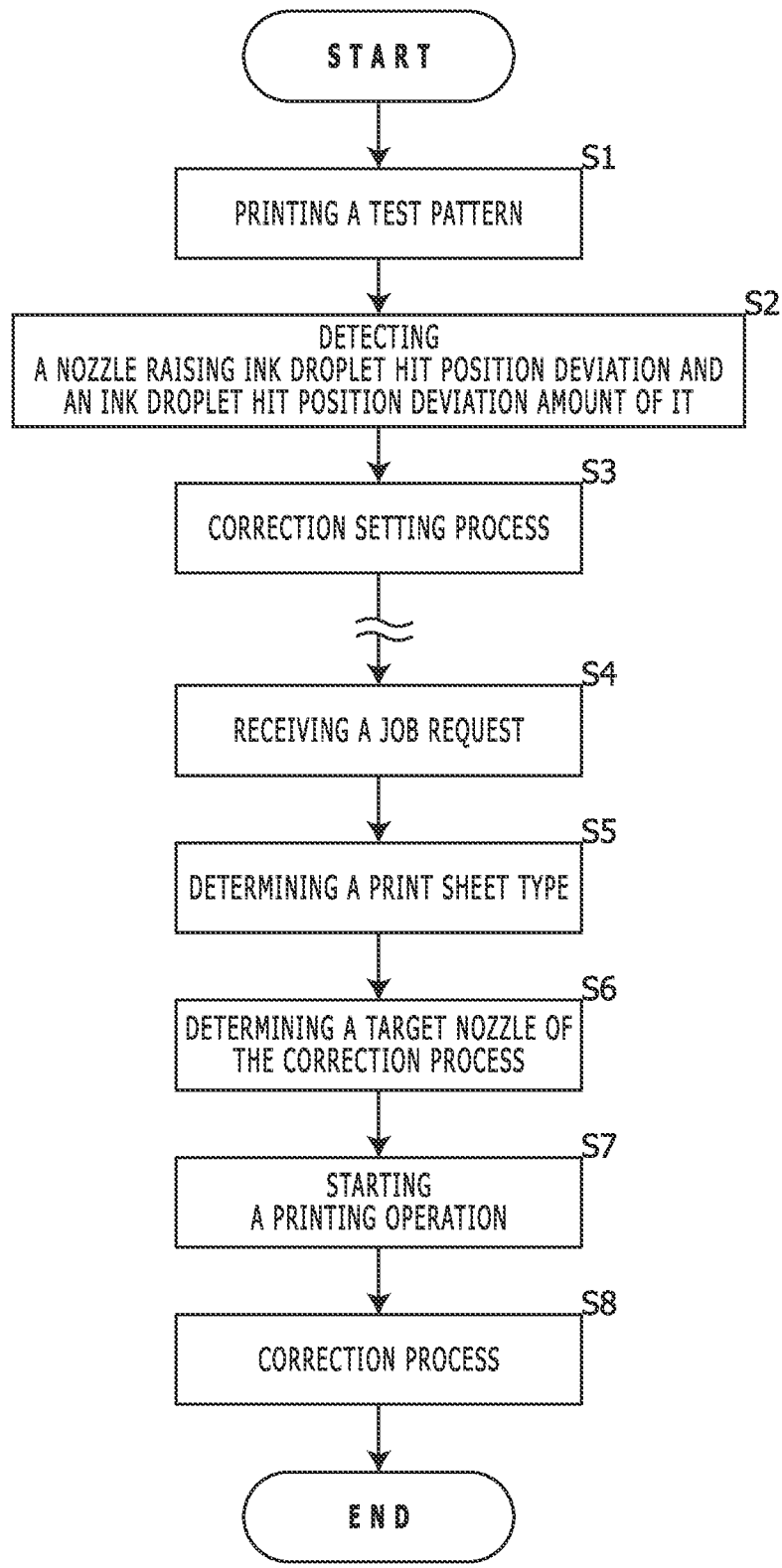
FIG. 6 shows a flowchart that explains a behavior of the image forming apparatus shown in FIGS. 1 to 3.

The following part explains a behavior of the image forming apparatus 10. FIG. 6 shows a flowchart that explains a behavior of the image forming apparatus shown in FIGS. 1 to 3.

(a) Detection of an Ink Ejection Malfunction Position and Setting of the Correction Process The correction processing unit 83 causes the image outputting unit 71 to print a test pattern on a print sheet (in Step S1).

The correction processing unit 83 obtains a scanned image (image data of each ink color) of the test pattern using the line sensor 31 or the image scanning device 74 as mentioned, and detects ink ejection malfunction positions (occurrence positions of ink droplet hit position deviation) on the basis of a primary-scanning-directional density distribution of the scanned image and determines a droplet hit position deviation amount at each of the ink ejection malfunction positions (in Step S2).

Subsequently, the correction processing unit 83 performs a correction setting process, and in this process, stores the detected ink ejection malfunction positions (specifically, nozzle numbers) and the respectively-corresponding droplet hit position deviation amounts so as to associate them with each other, as the correction setting data into the storage device 73 (in Step S73).

(b) Behavior for Printing

Afterward, the control unit 81 receives a job request of a print job or the like from the operation panel 72 or a host device (not shown) (in Step S4), and upon receiving the job request, the correction processing unit 83 determines a print sheet type of a print sheet to be used in printing performed in accordance with the job request (for example, on the basis of the job request) (in Step S5).

Subsequently, the correction processing unit 83 determines a threshold value corresponding to the determined print sheet type on the basis of the print sheet type data 73*a*, and determines for each nozzle specified by the correction setting data, whether the correction process should be performed or not on the basis of the determined threshold value and the droplet hit position deviation amount (in Step S6).

In the aforementioned manner, specified are the ink ejection malfunction positions (nozzles) for which the correction process should be processed. Meanwhile, upon receiving the job request, the control unit 81 performs an image process using the image processing unit 82 for an image specified by the job request and thereby obtains image data of an image to be printed.

Subsequently, after specifying the ink ejection malfunction positions (nozzles) for which the correction process should be processed as mentioned, the control unit 81 causes the image outputting unit 71 to transport a print sheet and print the image to be printed on the print sheet on the basis of the image data.

In this process, upon detecting a position of the print sheet by the line sensor 31, the correction processing unit 83 (a) determines a nozzle corresponding to each pixel in the aforementioned image, (b) determines ink ejection malfunction positions (i.e. corresponding nozzles) in the aforementioned image, and (c) performs the correction process for each of the ink ejection malfunction positions. Subsequently, the control unit 81 performs the aforementioned printing on the basis of the image data after the correction process.

As mentioned, in Embodiment 1, the recording head 1*a*, 1*b*, 1*c* or 1*d* ejects ink corresponding to an image to be printed, using arranged nozzles. The control unit 81 determines nozzles corresponding to the image to be printed, correspondingly to a position of a print sheet, and causes the recording head 1*a*, 1*b*, 1*c* or 1*d* to eject ink from the nozzles. The correction processing unit 83 performs a correction process corresponding to each of the plural ink ejection malfunction positions in the aforementioned image. Further, the correction processing unit (a) prints a test pattern using the recording heads 1*a* to 1*d*, (b) determines the ink ejection malfunction positions on the basis of a scanned image of the test pattern, (c) determines a droplet hit position deviation amount of the ink at each of the ink ejection malfunction positions, and (d) determines a print sheet type of the print sheet, performs comparison between the droplet hit position deviation amount and a threshold value set for the print sheet type, and determines whether the correction process should be performed to the ink ejection malfunction position or not on the basis of a result of the comparison.

Consequently, ink ejection malfunction positions (nozzles) for which the correction process is not necessary are determined correspondingly to the print sheet type, targets of the correction process are reduced, and thereby the correction process corresponding to ink ejection malfunction is effectively performed. Thus, since ink ejection malfunction positions as targets of the correction process are reduced, a time required for the correction process gets short. Therefore, in a short time from determination of a sheet position to ink ejection, it is possible to determine pixels corresponding to the malfunction nozzle in the image to be printed and perform the correction process for peripheries of the determined pixels. Consequently, on printed matter, severe density lack is restrained such as a blank line due to a malfunction nozzle.

Embodiment 2

In Embodiment 2, the correction processing unit 83 prints as the aforementioned test pattern a band-shaped test pattern that extends along the primary scanning direction (hereinafter, called "horizontal band test pattern") using nozzles of the recording heads 1*a* to 1*d*.

Figure 7:
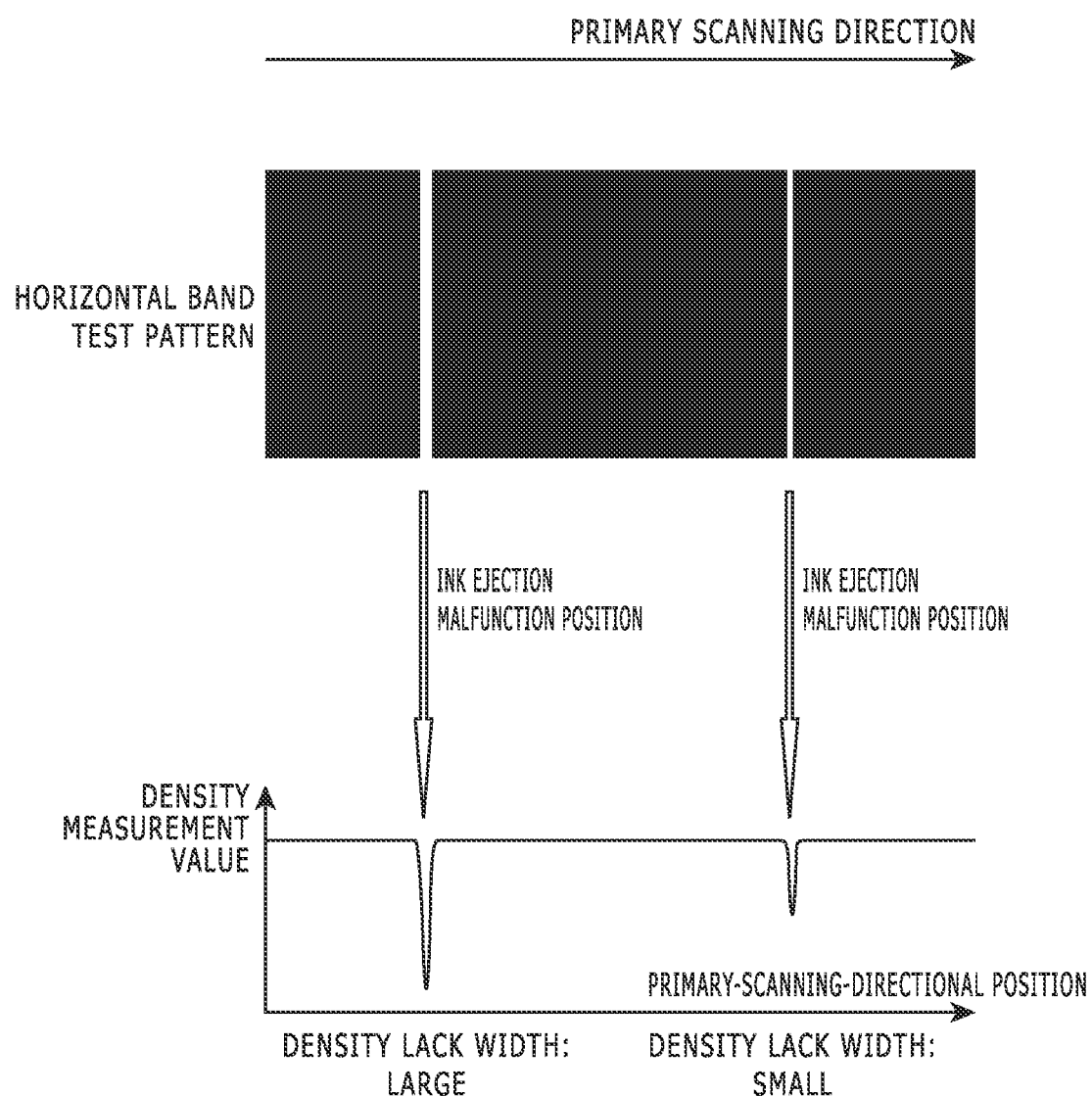
FIG. 7 shows a diagram that explains detection of a droplet hit position deviation amount based on a density distribution of a scanned image of a horizontal band test pattern.

FIG. 7 shows a diagram that explains detection of a droplet hit position deviation amount based on a density distribution of a scanned image of a horizontal band test pattern. In Embodiment 2, the correction processing unit 83 detects an appearance position of a dip in the density distribution of the scanned image of the horizontal band test pattern, as shown in FIG. 7, for example. In this detection, the smaller the density deviation amount is, the narrower the density lack width is; and therefore, the density deviation amount is determined on the basis of a minimum value of the dip (density measurement value) and/or a width of the dip in the density distribution.

Other parts of the configuration and behaviors of the image forming apparatus in Embodiment 2 are identical or similar to those in Embodiment 1, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
a recording head configured to eject ink corresponding to an image to be printed, using arranged nozzles;
a control unit configured to determine nozzles corresponding to the image to be printed, correspondingly to a position of a print sheet, and cause the recording head to eject ink from the nozzles; and
a correction processing unit configured to perform a correction process corresponding to each of plural ink ejection malfunction positions in the image;
wherein the correction processing unit (a) prints a test pattern comprising of vertical thin lines wherein each line corresponds to each arranged nozzle using the recording head, (b) determines the ink ejection malfunction positions on the basis of a scanned image of the test pattern, (c) determines a droplet hit position deviation amount of the ink at each of the ink ejection malfunction positions by measuring a deviation amount of a density detection position based on density detection positions in the scanned image of the vertical thin line in the test pattern and multiplying the measured deviation amount of the density detection position by a predetermined coefficient, and (d) determines a print sheet type of the print sheet, performs comparison between the droplet hit position deviation amount and a threshold value set for the print sheet type, and determines whether the correction process should be performed to the ink ejection malfunction position or not on the basis of a result of the comparison.

2. The image forming apparatus according to claim 1, wherein the threshold value of an impermeable sheet type as the print sheet type is set to be lower than the threshold value of a permeable sheet type as the print sheet type.

3. The image forming apparatus according to claim 2, wherein the correction processing unit prints the test pattern using the recording head on the print sheet of the impermeable sheet type.

4. The image forming apparatus according to claim 1, wherein the correction processing unit performs the correction process as a hardware process.

5. The image forming apparatus according to claim 1, further comprising a line sensor configured to detect a position of the print sheet;
wherein the line sensor generates the scanned image of the test pattern.

* * * * *